(12) United States Patent
Tamura

(10) Patent No.: US 11,535,808 B2
(45) Date of Patent: Dec. 27, 2022

(54) LUBRICATING OIL COMPOSITION

(71) Applicant: Idemitsu Kosan Co., Ltd., Chiyoda-ku (JP)

(72) Inventor: Kazushi Tamura, Chiba (JP)

(73) Assignee: Idemitsu Kosan Co., Ltd., Chiyoda-ku (JP)

( * ) Notice: Subject to any disclaimer, the term of this patent is extended or adjusted under 35 U.S.C. 154(b) by 0 days.

(21) Appl. No.: 17/287,315

(22) PCT Filed: Oct. 21, 2019

(86) PCT No.: PCT/JP2019/041270
§ 371 (c)(1),
(2) Date: Apr. 21, 2021

(87) PCT Pub. No.: WO2020/085285
PCT Pub. Date: Apr. 30, 2020

(65) Prior Publication Data
US 2022/0025292 A1    Jan. 27, 2022

(30) Foreign Application Priority Data

Oct. 24, 2018 (JP) .............................. JP2018-199713

(51) Int. Cl.
| | |
|---|---|
| *C10M 135/18* | (2006.01) |
| *C10M 169/00* | (2006.01) |
| *C10M 169/04* | (2006.01) |
| *H01M 10/613* | (2014.01) |
| *H01M 10/6567* | (2014.01) |
| *C09K 5/20* | (2006.01) |
| *C10M 135/10* | (2006.01) |
| *C10M 135/36* | (2006.01) |
| *C10M 137/04* | (2006.01) |
| *C10M 137/08* | (2006.01) |
| *C10M 141/10* | (2006.01) |
| *C10N 30/00* | (2006.01) |
| *C10N 10/04* | (2006.01) |
| *C10N 30/02* | (2006.01) |
| *C10N 40/04* | (2006.01) |
| *C10N 40/08* | (2006.01) |

(52) U.S. Cl.
CPC ............ *C10M 169/04* (2013.01); *C09K 5/20* (2013.01); *C10M 135/10* (2013.01); *C10M 135/36* (2013.01); *C10M 137/04* (2013.01); *C10M 137/08* (2013.01); *C10M 141/10* (2013.01); *H01M 10/613* (2015.04); *H01M 10/6567* (2015.04); *C10M 2203/003* (2013.01); *C10M 2219/044* (2013.01); *C10M 2219/046* (2013.01); *C10M 2219/106* (2013.01); *C10M 2223/04* (2013.01); *C10M 2223/041* (2013.01); *C10M 2223/043* (2013.01); *C10M 2223/049* (2013.01); *C10N 2010/04* (2013.01); *C10N 2030/02* (2013.01); *C10N 2030/42* (2020.05); *C10N 2030/43* (2020.05); *C10N 2040/04* (2013.01); *C10N 2040/08* (2013.01)

(58) Field of Classification Search
CPC ........................ C10M 169/04; C10M 135/10; C10M 135/36; C10M 137/04; C10M 137/08; C10M 141/10; C10M 2203/003; C10M 2219/044; C10M 2219/046; C10M 2219/106; C10M 2223/04; C10M 2223/041; C10M 2223/043; C10M 2223/049; C09K 5/20; H01M 10/613; H01M 10/6567; C10N 2010/04; C10N 2030/02; C10N 2030/42; C10N 2030/43; C10N 2040/04; C10N 2040/08
USPC .................................. 429/120; 508/162, 363
See application file for complete search history.

(56) References Cited

U.S. PATENT DOCUMENTS

| | | | |
|---|---|---|---|
| 2003/0158050 A1 | 8/2003 | Kawasaki et al. | |
| 2012/0277134 A1* | 11/2012 | Deshimaru | .......... C10M 141/10 508/272 |
| 2014/0107001 A1* | 4/2014 | Saccomando | ........ C10M 129/72 508/287 |
| 2015/0203780 A1 | 7/2015 | Yagishita | |

(Continued)

FOREIGN PATENT DOCUMENTS

| | | |
|---|---|---|
| CN | 105026535 A | 11/2015 |
| EP | 2 520 640 A1 | 11/2012 |

(Continued)

OTHER PUBLICATIONS

International Search Report dated Dec. 10, 2019 in PCT/JP2019/041270 filed on Oct. 21, 2019, 2 pages.

(Continued)

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

A lubricating oil composition may include a base oil (A), a neutral phosphorus compound (B), an acidic phosphorus compound (C), a sulfur compound (D) and a metal salt (E) including a metal sulfonate, a metal salicylate, and/or a metal phenate, in which a content of the acidic phosphorus compound (C) in terms of phosphorus atoms is 10 to 180 ppm by mass based on the total amount of the lubricating oil composition, a content of the sulfur compound (D) in terms of sulfur atoms is 10 to 1000 ppm by mass based on the total amount of the lubricating oil composition, and a content of the metal salt (E) in terms of metal atoms is 5 to 180 ppm by mass based on the total amount of the lubricating oil composition.

18 Claims, No Drawings

(56) References Cited

U.S. PATENT DOCUMENTS

| | | |
|---|---|---|
| 2017/0051228 A1 | 2/2017 | Narita et al. |
| 2018/0100114 A1 | 4/2018 | Gao et al. |
| 2020/0172825 A1 | 6/2020 | Narita |

FOREIGN PATENT DOCUMENTS

| | | |
|---|---|---|
| EP | 2 692 841 A1 | 2/2014 |
| EP | 3 109 299 A1 | 12/2016 |
| JP | 2003-171684 A | 6/2003 |
| JP | 2014-517106 | 7/2014 |
| JP | 2015-151490 A | 8/2015 |
| WO | WO 92/19703 A1 | 11/1992 |
| WO | WO 2011/080970 A1 | 7/2011 |
| WO | WO 2018/190431 A1 | 10/2018 |
| WO | WO 2019/167431 A1 | 9/2019 |

OTHER PUBLICATIONS

Extended European Search Report dated Jun. 15, 2022 in European Patent Application No. 19876448.2, 7 pages.
Combined Chinese Office Action and Search Report dated May 18, 2022 in Chinese Patent Application No. 201980069210.7 (with partial English translation), 15 pages.
Office Action dated Oct. 11, 2022, in Japanese Application Patent No. 2018-199713 filed Oct. 24, 2018 (with machine generated English translation).

* cited by examiner

LUBRICATING OIL COMPOSITION

TECHNICAL FIELD

The present invention relates to a lubricating oil composition.

BACKGROUND ART

In recent years, there has been a strong demand for $CO_2$ reduction from the perspective of protecting the global environment, and in the automotive field, efforts have been focused on developing technologies to reduce fuel consumption. Hybrid vehicles and electric vehicles are the mainstream technologies for fuel economy, and are expected to spread rapidly in the future. Hybrid vehicles and electric vehicles are equipped with electric motors and generators, and when these are cooled by the oil cooling system, the existing automatic transmission fluid (ATF) and continuously variable transmission fluid (CVTF) for multistage transmission are mainly used as lubricating oil compositions.

These lubricating oil compositions require electrical insulation to maintain long-term reliability in terms of friction control of wet clutches and wear resistance that can control metal-to-metal wear, as well as the insulation of electric motors.

For example, Patent Literature 1 discloses the lubricant composition used for cooling of and lubricating gears in electric motors in hybrid or electric vehicles, which is prepared with a volume resistivity of $5 \times 10^{10}$ Ωm or more.

CITATION LIST

Patent Literature

Patent Literature 1: WO2011/080970

SUMMARY OF INVENTION

Technical Problem

However, the lubricating oil compositions used in various machines such as electric motors are often required to improve not only electrical insulation but also other properties such as wear resistance depending on the mode of the machine.

In other words, compared to the conventional lubricating oil compositions, there is a demand for a lubricant composition that can be used favorably for lubricating various machines.

Solution to Problem

The present invention provides a lubricating oil composition comprising a base oil, a neutral phosphorus compound, an acidic phosphorus compound, a sulfur compound, and a specified metal salt, in which as well as a specific range of the acidic phosphorus compound, the sulfur compound, and the metal salt are adjusted within specific ranges.

The present invention, for example, provides the following [1] to [14].

[1] A lubricating oil composition comprising a base oil (A), a neutral phosphorus compound (B), an acidic phosphorus compound (C), a sulfur compound (D) and at least one metal salt (E) selected from a metal sulfonate, a metal salicylate, and a metal phenate,
wherein a content of the acidic phosphorus compound (C) in terms of phosphorus atoms is 10 to 180 ppm by mass based on the total amount of the lubricating oil composition,
a content of the sulfur compound (D) in terms of sulfur atoms is 10 to 1000 ppm by mass based on the total amount of the lubricating oil composition, and
a content of the metal salt (E) in terms of metal atoms is 5 to 180 ppm by mass based on the total amount of the lubricating oil composition.

[2] The lubricating oil composition according to [1], wherein a content of the neutral phosphorus compound (B) in terms of phosphorus atoms is 50 to 2000 ppm by mass based on the total amount of the lubricating oil composition.

[3] The lubricating oil composition according to [1] or [2], wherein the acidic phosphorus compound (C) comprises one or more kinds selected from a compound (C1) represented by the following general formula (c-1), a compound (C2) represented by the following general formula (c-2), and an amine salt (C3) of the compound (C1) or (C2):

[in the formulas (c-1) and (c-2), $R^1$ and $R^2$ are each independently a hydrocarbon group having 6 to 30 carbon atoms, and m and n are each independently 1 or 2].

[4] The lubricating oil composition according to any one of [1] to [3], wherein the sulfur compound (D) comprises a compound (D1) represented by the following general formula (d-1):

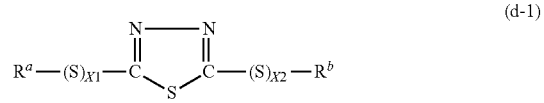

[in the formula (d-1), $R^a$ and $R^b$ are each independently a hydrocarbon group, and x1 and x2 are each independently an integer of 1 to 3].

[5] The lubricating oil composition according to any one of [1] to [4], wherein the metal salt (E) comprises an overbased metal salt (E1) having a base number of 100 mg KOH/g or more.

[6] The lubricating oil composition according to any one of [1] to [5], wherein a ratio of the content of the sulfur compound (D) in terms of sulfur atoms to the content of the metal salt (E) in terms of metal atoms [(D)/(E)] is 3.0 to 20.0 in terms of mass ratio.

[7] The lubricating oil composition according to any one of [1] to [6], wherein a kinetic viscosity of the lubricating oil composition at 40° C. is 6.0 to 18.0 $mm^2/s$.

[8] The lubricating oil composition according to any one of [1] to [7], wherein a volume resistivity of the lubricating oil composition measured under conditions of a measurement temperature of 80° C. and an applied voltage of 250 V in accordance with JIS C2101 is $5.0 \times 10^7$ Ωm or more.

[9] The lubricating oil composition according to any one of [1] to [8], wherein when a shell four-ball abrasion test is performed using the lubricating oil composition under conditions of a rotational speed of 1800 rpm, a test temperature of 80° C., a load of 392 N, and a test time of 30 minutes in accordance with ASTM D4172, a wear scar size of a test ball is 0.70 mm or less.

[10] The lubricating oil composition according to any one of [1] to [9], wherein when an ISOT test using the lubricating oil composition with a copper piece used as a catalyst is performed at a test temperature of 165.5° C. and a test time of 144 hours in accordance with JIS K2514, an amount of copper eluted of degraded oil after the test is less than 30 ppm by mass.

[11] A method for producing the lubricating oil composition according to any one of [1] to [10], the method comprising:
a step of blending a base oil (A) with a neutral phosphorus compound (B), an acidic phosphorus compound (C), a sulfur compound (D), and at least one metal salt (E) selected from a metal sulfonate, a metal salicylate, and a metal phenate.

[12] A machine using the lubricating oil composition according to any one of [1] to [10].

[13] The machine according to [12], wherein the machine is a hydraulic system, a stationary transmission, an automotive transmission, or a cooling system for at least one of a motor and a battery.

[14] Use of a lubricating oil composition, wherein the use comprising using the lubricating oil composition according to any one of [1] to [10] in a hydraulic system, a stationary transmission, an automotive transmission, or a cooling system for at least one of a motor and a battery.

ADVANTAGEOUS EFFECTS OF INVENTION

The lubricating oil composition in a preferred aspect of the present invention has excellent properties such as abrasion resistance between metals, electrical insulation, and the effect of preventing copper elution, and therefore it can be more preferably used for lubricating various machines.

DESCRIPTION OF EMBODIMENTS

[Configuration of Lubricating Oil Composition]

The lubricating oil composition of the present invention comprises a base oil (A), a neutral phosphorus compound (B), an acidic phosphorus compound (C), a sulfur compound (D) and at least one metal salt (E) selected from a metal sulfonate, a metal salicylate, and a metal phenate.

In addition, the lubricating oil composition in one aspect of the present invention may further contain additives for lubricating oil other than the above components (B) to (E), if necessary, as long as the effects of the present invention are not impaired.

In the lubricating oil composition in one aspect of the present invention, the total content of the components (A), (B), (C), (D), and (E) based on the total amount (100% by mass) of the lubricating oil composition is preferably 70% to 100% by mass, more preferably 80% to 100% by mass, still more preferably 85% to 100% by mass, and even more preferably 90% to 100% by mass.

Hereinafter, details of each component comprised in the lubricating oil composition in one aspect of the present invention will be described.

<Base Oil (A)>

The base oil (A) used in one aspect of the present invention is one or more kinds selected from mineral oils and synthetic oils.

Examples of mineral oils include: atmospheric pressure residual oils obtained by distillation of paraffin-based crude oil, intermediate-base crude oil, naphthene-based crude oil, and the like; distillates obtained by distilling these atmospheric pressure residual oils under reduced pressure; refined oils obtained by treating these distillates via one or more purification treatments such as solvent deasphalting, solvent extraction, hydrogenolysis, solvent dewaxing, catalytic dewaxing, and hydrorefining; and mineral oils (GTL) obtained by isomerizing wax (gas-to-liquid (GTL) wax) produced from natural gas by the Fischer-Tropsch method or the like.

Examples of synthetic oils include: poly α-olefins such as α-olefin homopolymers or α-olefin copolymers (e.g., α-olefin copolymers having 8 to 14 carbon atoms such as ethylene-a-olefin copolymers); isoparaffin; polyalkylene glycol; ester oils such as polyol ester, dibasic acid ester, and phosphate ester; ether oils such as polyphenyl ether; alkyl benzene; and alkyl naphthalene.

It is preferable that the base oil (A) used in one aspect of the present invention is one or more kinds selected from mineral oils and synthetic oils classified as Group 2 and Group 3 of the American Petroleum Institute (API) Base Oil categories.

The kinetic viscosity of the base oil (A) used in one aspect of the present invention at 40° C. is preferably 6.0 to 18.0 mm$^2$/s, more preferably 6.5 to 15.0 mm$^2$/s, still more preferably 7.0 to 13.0 mm$^2$/s, and even more preferably 7.5 to 11.5 mm$^2$/s.

The viscosity index of the base oil (A) used in one aspect of the present invention is preferably 70 or more, more preferably 80 or more, still more preferably 90 or more, and even more preferably 100 or more.

In one aspect of the present invention, when a mixed oil in which two or more kinds of base oils are combined is used as the base oil (A), the kinetic viscosity and the viscosity index of the mixed oil are preferably in the above ranges.

The kinetic viscosity and the viscosity index described herein mean the values measured and calculated in accordance with JIS K2283: 2000.

In the lubricating oil composition in one aspect of the present invention, the content of the base oil (A) based on the total amount (100% by mass) of the lubricating oil composition is preferably 60% to 99.5% by mass, more preferably 70% to 99.0% by mass, still more preferably 80% to 98.0% by mass, and even more preferably 85% to 97.0% by mass.

<Neutral Phosphorus Compound (B)>

The lubricating oil composition of the present invention comprises a lubricating oil composition (B) in order to improve abrasion resistance between metals.

The neutral phosphorus compound (B) may be used singly or in combination of two or more kinds thereof.

The content of the neutral phosphorus compound (B) in terms of phosphorus atoms in the lubricating oil composition of the present invention based on the total amount (100% by mass) of the lubricating oil composition is preferably 50 ppm by mass or more, more preferably 100 ppm by mass or more, still more preferably 150 ppm by mass or more, and even more preferably 200 ppm by mass or more from the viewpoint of allowing the lubricating oil composition to have further improved abrasion resistance between metals, while it is preferably 2000 ppm by mass or less, more preferably 1500 ppm by mass or less, still more preferably 1000 ppm by mass or less, and even more preferably 800 ppm by mass or less from the viewpoint of improving the solubility in the base oil (A).

The content of phosphorus atoms described herein means a value measured in accordance with JPI-5S-38-92.

The neutral phosphorus compound (B) used in one aspect of the present invention include: aromatic neutral phosphate esters such as tricresyl phosphate, triphenyl phosphate, trixylenyl phosphate, and dicresyl monophenyl phosphate; aliphatic neutral phosphate esters such as tributyl phosphate, tri-2-ethylhexyl phosphate, and tributoxy phosphate; aromatic neutral phosphite esters such as triphenyl phosphite, tricresyl phosphite, trisnonylphenyl phosphite, diphenyl-mono-2-ethylhexyl phosphite, and diphenylmonotridecyl phosphite; and aliphatic neutral phosphite esters such as tributyl phosphite, trioctyl phosphite, trisdecyl phosphite, tristridecyl phosphite, and trioleyl phosphite.

Of these, from the viewpoint of allowing the lubricating oil composition to have further improved abrasion resistance between metals, the neutral phosphorus compound (B) used in one aspect of the present invention comprises preferably at least one selected from a neutral phosphate ester (B1) represented by the following general formula (b-1) and a neutral phosphite ester (B2) represented by the following general formula (b-2), and more preferably at least a neutral phosphate ester (B1) represented by the following general formula (b-1).

The proportion of the component (B1) comprised in the component (B) based on the total amount (100% by mass) of the component (B) comprised in the lubricating oil composition is preferably 50% to 100% by mass, more preferably 60% to 100% by mass, still more preferably 70% to 100% by mass, even more preferably 80% to 100% by mass, and particularly preferably 90% to 100% by mass.

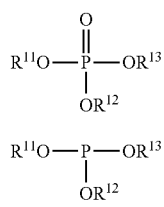

In the general formulas (b-1) and (b-2), $R^{11}$ to $R^{13}$ are each independently an aryl group having 6 to 18 carbon atoms which may be substituted with an alkyl group having 3 to 20 carbon atoms or an alkyl group having 1 to 4 carbon atoms. From the above viewpoints, they are each preferably a phenyl group which may be substituted with an alkyl group having 1 to 4 carbon atoms.

Examples of the alkyl group having 3 to 20 carbon atoms which can be selected as $R^{11}$ to $R^{13}$ include a propyl group (n-propyl group, isopropyl group), a butyl group (n-butyl group, s-butyl group, t-butyl group, isobutyl group), a pentyl group, a hexyl group, a 2-ethylhexyl group, a heptyl group, an octyl group, a nonyl group, a decyl group, an undecyl group, a dodecyl group, and a tridecyl group.

These alkyl groups can be either linear or branched alkyl groups.

Examples of the aryl group having 6 to 18 carbon atoms include a phenyl group, a naphthyl group, an anthryl group, a phenanthryl group, a biphenyl group, a terphenyl group, and a phenylnaphthyl group, and a phenyl group is preferable.

Examples of an "aryl group substituted with an alkyl group having 1 to 4 carbon atoms" which can be selected as $R^{11}$ to $R^{13}$ include a group in which at least one of hydrogen atoms bonded to the ring-forming carbon atom of the above-described aryl group is substituted with an alkyl group having 1 to 4 carbon atoms (a methyl group, an ethyl group, the above-described propyl group, or the above-described butyl group). The number of alkyl groups substituted with one such aryl group is preferably 1 to 2 and more preferably 1.

<Acidic Phosphorus Compound (C)>

The lubricating oil composition of the present invention comprises an acidic phosphorus compound (C). The acidic phosphorus compound (C) may be used singly or in combination of two or more kinds thereof.

The content of the acidic phosphorus compound (C) in terms of phosphorus atoms in the lubricating oil composition of the present invention is 10 to 180 ppm by mass based on the total amount (100% by mass) of the lubricating oil composition.

When the content is less than 10 ppm by mass, the lubricating oil composition has poor abrasion resistance between metals. In addition, when the content is more than 180 ppm by mass, the lubricating oil composition has poor electrical resistance.

The content of the acidic phosphorus compound (C) in terms of phosphorus atoms in the lubricating oil composition in one aspect of the present invention based on the total amount (100% by mass) of the lubricating oil composition is 10 ppm by mass or more, preferably 15 ppm by mass or more, more preferably 20 ppm by mass or more, and still more preferably 25 ppm by mass or more from the viewpoint of allowing the lubricating oil composition to have further improved abrasion resistance between metals, while it is 180 ppm by mass or less, preferably 160 ppm by mass or less, more preferably 150 ppm by mass or less, and still more preferably 120 ppm by mass or less from the viewpoint of allowing the lubricating oil composition to have further improved electrical insulation.

It is preferable that the acidic phosphorus compound (C) for use in one aspect of the present invention comprises one or more kinds selected from a compound (C1) represented by the following general formula (c-1), a compound (C2) represented by the following general formula (c-2), and an amine salt (C3) of the compound (C1) or (C2) from the viewpoint of allowing the lubricating oil composition to have improved abrasion resistance between metals and electrical insulation in a well-balanced manner.

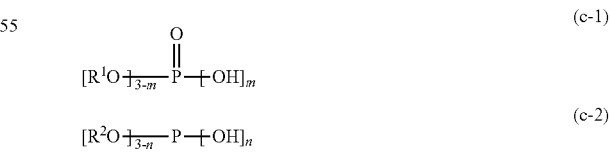

The total proportion of the components (C1), (C2), and (C3) in the component (C) based on the total amount (100% by mass) of the component (C) comprised in the lubricating oil composition is preferably 70% to 100% by mass, more preferably 80% to 100% by mass, and still more preferably 90% to 100% by mass.

In the general formulas (c-1) and (c-2), $R^1$ and $R^2$ are each independently a hydrocarbon group having 6 to 30 carbon atoms (preferably 8 to 20 carbon atoms). In a case in which there are a plurality of $R^1$ and $R^2$, the plurality of $R^1$ and $R^2$ may be the same or different from each other.

m and n are each independently 1 or 2. Therefore, the compound (C1) refers to each of compounds represented by the following general formulas (c-11) and (c-12), and the compound (C2) refers to each of compounds represented by the following general formulas (c-21) and (c-22).

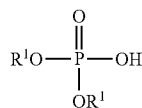  (c-11)

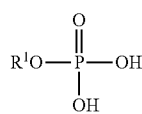  (c-12)

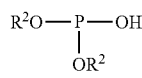  (c-21)

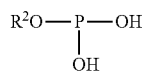  (c-22)

The hydrocarbon group which can be selected as $R^1$ and $R^2$, may be a group composed of carbon and hydrogen atoms. Examples thereof include an alkyl group, an alkenyl group, an aryl group, an alkylaryl group, and an arylalkyl group.

Examples of the alkyl group include a hexyl group, a heptyl group, an octyl group, a 2-ethylhexyl group, a nonyl group, a decyl group, an undecyl group, a dodecyl group, a tridecyl group, a tetradecyl group, a hexadecyl group, and an octadecyl group.

Examples of the alkenyl group include a hexenyl group, a heptenyl group, an octenyl group, a nonenyl group, a decenyl group, an undecenyl group, a dodecenyl group, a tridecenyl group, a tetradecenyl group, a hexadecenyl group, and an octadecenyl group.

The alkyl group and the alkenyl group can be each a linear or branched group.

Examples of the aryl group include a phenyl group, a naphthyl group, an anthryl group, a phenanthryl group, a biphenyl group, a terphenyl group, and a phenylnaphthyl group.

Examples of the alkylaryl group include a group in which the above-described aryl group is substituted with one or more alkyl groups having 1 to 6 (preferably 1 to 3) carbon atoms.

Examples of the arylalkyl group include a group in which an alkyl group having 1 to 6 (preferably 1 to 3) carbon atoms is substituted with one or more of the above-described aryl groups.

Examples of the alkylaryl group and an alkyl group having 1 to 6 carbon atoms of the arylalkyl group include a methyl group, an ethyl group, a propyl group (n-propyl group, isopropyl group), a butyl group (n-butyl group, s-butyl group, t-butyl group, isobutyl group), a pentyl group, and a hexyl group.

It is also preferable that amine that forms the amine salt (C3) is a compound represented by the following general formula (c-3). The amine may be used singly or in combination of two or more kinds thereof.

  (c-3)

In the general formula (c-3), q represents an integer of 1 to 3, and it is preferably 1 from the viewpoint of allowing the lubricating oil composition to have improved abrasion resistance between metals and electrical insulation in a well-balanced manner.

$R^3$ is independently an alkyl group having 6 to 18 carbon atoms, an alkenyl group having 6 to 18 carbon atoms, an aryl group having 6 to 18 carbon atoms, an arylalkyl group having 7 to 18 carbon atoms, or a hydroxyalkyl group having 6 to 18 carbon atoms. It is preferably an alkyl group having 6 to 18 carbon atoms from the viewpoint of allowing the lubricating oil composition to have improved abrasion resistance between metals and electrical insulation in a well-balanced manner.

In a case in which there are a plurality of $R^3$, the plurality of $R^3$ may be the same or different from each other.

Examples of an alkyl group having 6 to 18 carbon atoms, an alkenyl group having 6 to 18 carbon atoms, an aryl group having 6 to 18 carbon atoms, and an arylalkyl group having 7 to 18 carbon atoms which can be selected as $R^3$ include those which are the same as the groups each having a specified number of carbon atoms among an alkyl group, an alkenyl group, an aryl group, and an arylalkyl group which can be selected as $R^1$ and $R^2$ described above.

In addition, examples of a hydroxyalkyl group having 6 to 18 carbon atoms include a group in which at least one hydrogen atom of an alkyl group which can be selected as $R^1$ and $R^2$ in the above general formula (c-1) or (c-2) is substituted with a hydroxy group. Specific examples thereof include a hydroxyhexyl group, a hydroxyoctyl group, a hydroxydodecyl group, and a hydroxytridecyl group.

It is preferable that the acidic phosphorus compound (C) in the lubricating oil composition in one aspect of the present invention comprises at least the amine salt (C3) from the viewpoint of allowing the lubricating oil composition to have improved abrasion resistance between metals and electrical insulation in a well-balanced manner.

The proportion of the amine salt (C3) comprised in the component (C) based on the total amount (100% by mass) of the component (C) comprised in the lubricating oil composition is preferably 50% to 100% by mass, more preferably 60% to 100% by mass, still more preferably 70% to 100% by mass, and even more preferably 80% to 100% by mass.

<Sulfur Compound (D)>

The lubricating oil composition of the present invention comprises a sulfur compound (D). The sulfur compound (D) may be used singly or in combination of two or more kinds thereof.

The content of the sulfur compound (D) in terms of sulfur atoms in the lubricating oil composition of the present invention is 10 to 1000 ppm by mass based on the total amount (100% by mass) of the lubricating oil composition.

When the content is less than 10 ppm by mass, the lubricating oil composition has poor abrasion resistance between metals. The inclusion of a metal salt (E) tends to make it difficult to exhibit the effect of preventing copper elution to a sufficient extent.

The content of the sulfur compound (D) in terms of sulfur atoms in the lubricating oil composition in one aspect of the present invention based on the total amount (100% by mass) of the lubricating oil composition is 10 to 1000 ppm by mass, preferably 50 to 900 ppm by mass, more preferably 100 to 850 ppm by mass, still more preferably 200 to 800 ppm by mass, and even more preferably 300 to 750 ppm by mass from the viewpoints of allowing the lubricating oil composition to have improved abrasion resistance between metals and to easily exhibit the effect of preventing copper elution to a sufficient extent.

The content of sulfur atoms described herein means a value measured in accordance with JIS K2541-6:2013.

Examples of the sulfur compound (D) for use in one aspect of the present invention include thiadiazole compounds, polysulfide compounds, thiocarbamate compounds, sulfurized fat-and-oil compounds, and olefin sulfide compounds.

Of these, a compound (D1) represented by the following general formula (d-1) is preferably comprised from the viewpoints of allowing the lubricating oil composition to have improved abrasion resistance between metals and to easily exhibit the effect of preventing copper elution to a sufficient extent.

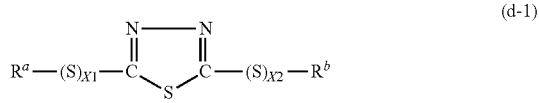

(d-1)

The proportion of the component (D1) in the component (D) based on the total amount (100% by mass) of the component (D) comprised in the lubricating oil composition is preferably 60% to 100% by mass, more preferably 70% to 100% by mass, and still more preferably 80% to 100% by mass.

In the general formula (d-1), $R^a$ and $R^b$ are each independently a hydrocarbon group.

x1 and x2 are each independently an integer of 1 to 3.

Examples of a hydrocarbon group which can be selected as $R^a$ and $R^b$ include an alkyl group having 1 to 30 carbon atoms, an alkenyl group having 2 to 30 carbon atoms, an aryl group having 6 to 30 carbon atoms, an alkylaryl group having 7 to 30 carbon atoms, and an arylalkyl group having 7 to 30 carbon atoms. It is preferably an alkyl group having 1 to 30 carbon atoms from the viewpoints of allowing the lubricating oil composition to have improved abrasion resistance between metals and to easily exhibit the effect of preventing copper elution to a sufficient extent.

Examples of the alkyl group include a methyl group, an ethyl group, a propyl group (n-propyl group, isopropyl group), a butyl group (n-butyl group, s-butyl group, t-butyl group, isobutyl group), a pentyl group, and those which are the same as the alkyl group which can be selected as $R^1$ and $R^2$ in the general formula (c-1) or (c-2).

Examples of the alkenyl group include a vinyl group, a propenyl group, a butenyl group, a pentenyl group, and those which are the same as the alkenyl group which can be selected as $R^1$ and $R^2$ in the general formula (c-1) or (c-2).

The alkyl group and the alkenyl group can be each a linear or branched group.

Examples of the aryl group, the alkylaryl group, and the arylalkyl group include those which are the same as the alkenyl group which can be selected as $R^1$ and $R^2$ in the general formula (c-1) or (c-2).

<Metal Salt (E)>

The lubricating oil composition of the present invention comprises at least one metal salt (E) selected from a metal sulfonate, a metal salicylate, and a metal phenate. The metal salt (E) may be used singly or in combination of two or more kinds thereof.

The present inventors found that it is possible to obtain a lubricating oil composition maintaining favorable abrasion resistance between metals and electrical insulation while having the further improved effect of preventing copper elution by allowing a lubricating oil composition comprising a predetermined amount of the sulfur compound (D) to further comprise the metal salt (E). A lubricating oil composition having a great effect of preventing copper elution is advantageous in that it can prevent damage to the copper wire used in a motor coil of a unit for an electric vehicle or a hybrid vehicle, for example, and therefore it is suitable for such applications.

The content of the metal salt (E) in terms of metal atoms in the lubricating oil composition of the present invention is 5 to 180 ppm by mass based on the total amount (100% by mass) of the lubricating oil composition.

When the content is less than 5 ppm by mass, the lubricating oil composition has a poor effect of preventing copper elution. In addition, when the content is less than 180 ppm by mass, the lubricating oil composition has decreased and poor levels of abrasion resistance between metals and electrical insulation.

The content of the metal salt (E) in terms of metal atoms in the lubricating oil composition in one aspect of the present invention based on the total amount (100% by mass) of the lubricating oil composition is 5 ppm by mass or more, preferably 10 ppm by mass or more, more preferably 20 ppm by mass or more, still more preferably 30 ppm by mass or more, and even more preferably 40 ppm by mass or more from the viewpoint of allowing the lubricating oil composition to have the further improved effect of preventing copper elution, while the content is 180 ppm by mass or less, preferably 170 ppm by mass or less, more preferably 160 ppm by mass or less, still more preferably 150 ppm by mass or less, and even more preferably 130 ppm by mass or less from the viewpoint of allowing the lubricating oil composition to be capable of maintaining favorable abrasion resistance between metals and electrical insulation.

The content of metal atoms described herein means a value measured in accordance with JPI-5S-38-92.

In addition, the ratio of the content of the sulfur compound (D) in terms of sulfur atoms to the content of the metal salt (E) in terms of metal atoms [(D)/(E)] is preferably 3.0 to 20.0, more preferably 3.5 to 18.0, still more preferably 4.5 to 16.0, and even more preferably 6.0 to 15.0 in terms of mass ratio from the viewpoint of allowing the lubricating oil composition in one aspect of the present invention to have the further improved effect of preventing copper elution.

In one aspect of the present invention, when used as the metal salt (E), metal sulfonate is preferably a compound represented by the following general formula (e-1), metal salicylate is preferably a compound represented by the following general formula (e-2), and metal phenate is preferably a compound represented by the following general formula (e-3).

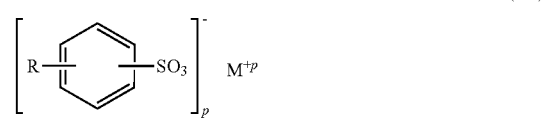

(e-1)

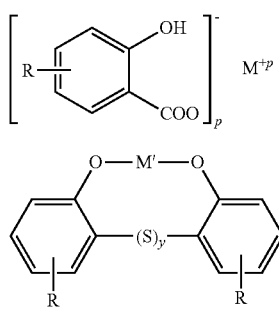

(e-2)

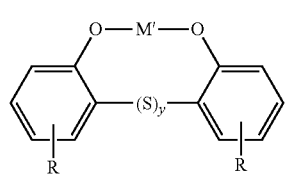

(e-3)

In the general formulas (e-1) and (e-2), M is an atom of a metal selected from alkaline and alkaline earth metals, which is preferably sodium, calcium, magnesium, or barium, and more preferably calcium.

In the general formula (e-3), M' is an alkaline earth metal, which is preferably calcium, magnesium, or barium, and more favorably calcium. y is an integer of 0 or more, which is preferably an integer of 0 to 3.

In the general formulas (e-1) to (e-3), p is the valence of M, which is 1 or 2. R is a hydrogen atom or a hydrocarbon group having 1 to 18 carbon atoms.

Examples of a hydrocarbon group which can be selected as R include an alkyl group having 1 to 18 carbon atoms, an alkenyl group having 1 to 18 carbon atoms, a cycloalkyl group having 3 to 18 ring-forming carbon atoms, an aryl group having 6 to 18 ring-forming carbon atoms, an alkylaryl group having 7 to 18 carbon atoms, and an arylalkyl group having 7 to 18 carbon atoms.

The metal salt (E) comprises preferably at least metal sulfonate and more preferably at least calcium sulfonate from the viewpoint of allowing the lubricating oil composition in one aspect of the present invention to have the further improved effect of preventing copper elution.

The proportion of the metal sulfonate comprised in the component (E) based on the total amount (100% by mass) of the component (E) comprised in the lubricating oil composition is preferably 50% to 100% by mass, more preferably 60% to 100% by mass, still more preferably 70% to 100% by mass, and even more preferably 80% to 100% by mass.

The base number of the metal salt (E) is preferably 0 to 600 mg KOH/g.

The metal salt (E) comprises preferably an overbased metal salt (E1) having a base number of 100 mg KOH/g or more from the viewpoint of allowing the lubricating oil composition in one aspect of the present invention to have the further improved effect of preventing copper elution.

The base number of the overbased metal salt (E1) is 100 mg KOH/g or more, preferably 150 to 500 mg KOH/g, and more preferably 200 to 400 mg KOH/g.

The "base number" described herein means a base number determined by the perchloric acid method in accordance with the item 7. of JIS K2501 "Petroleum products and lubricants—Determination of neutralization number."

<Additives for Lubricating Oil>

The lubricating oil composition in one aspect of the present invention may further contain additives for lubricating oil other than the above components (B) to (E), if necessary, as long as the effects of the present invention are not impaired.

Examples of such additives for lubricating oil include pour point depressants, viscosity index improvers, antioxidants, ash-free dispersants, anti-foam agents, corrosion inhibitors, metal deactivators, and anti-static agents.

These additives for lubricating oil may be used singly or in combination of two or more kinds thereof.

The content of each of these additives for lubricating oil can be adjusted as appropriate without impairing the effects of the present invention, and the content of each additive is usually 0.001% to 15% by mass, preferably 0.005% to 10% by mass, and more preferably 0.01% to 5% by mass independently based on the total amount (100% by mass) of the lubricating oil composition.

<Method for Producing Lubricating Oil Composition>

The method for producing a lubricating oil composition in one aspect of the present invention is not particularly limited. From the viewpoint of productivity, the method preferably comprises a step of blending a base oil (A) with a neutral phosphorus compound (B), an acidic phosphorus compound (C), a sulfur compound (D), and at least one metal salt (E) selected from a metal sulfonate, a metal salicylate, and a metal phenate.

Here, the blending amounts of the components (B), (C), (D), and (E) are appropriately adjusted such that the contents of the phosphorus atoms, sulfur atoms, and metal atoms are within the above ranges.

[Description of Lubricating Oil Composition]

The kinetic viscosity of the lubricating oil composition of the present invention at 40° C. is preferably 0 to 18.0 mm²/s, more preferably 6.5 to 15 0 mm²/s, still more preferably 7.0 to 13.0 mm²/s, and even more preferably 7.5 to 11.5 mm²/s.

For the lubricating oil composition in one aspect of the present invention, the volume resistivity of the lubricating oil composition measured under conditions of a measurement temperature of 80° C. and an applied voltage of 250 V in accordance with JIS C2101 is preferably $5.0 \times 10^7$ Ωm or more, more preferably $7.5 \times 10^7$ Ωm or more, still more preferably $1.0 \times 10^8$ Ωm or more.

The specific method for measuring the volume resistivity of the lubricating oil composition is as explained in the Examples described later.

When a shell four-ball abrasion test is performed using the lubricating oil composition in one aspect of the present invention under conditions of a rotational speed of 1800 rpm, a test temperature of 80° C., a load of 392 N, and a test time of 30 minutes in accordance with ASTM D4172, the wear scar size of a test ball is preferably 0.70 mm or less, more preferably 0.68 mm or less, and still more preferably 0.65 mm or less.

The specific test method for the shell four-ball abrasion test is as explained in the Examples described later.

When an ISOT test using the lubricating oil composition in one aspect of the present invention with a copper piece used as a catalyst is performed at a test temperature of 165.5° C. and a test time of 144 hours in accordance with JIS K2514, the amount of copper eluted of degraded oil after the test is preferably less than 30 ppm by mass, more preferably less than 25 ppm by mass, and still more preferably less than 22 ppm by mass.

The amount of copper eluted of degraded oil means a value measured in accordance with PI-5S-38-92.

The specific test method for the ISOT test is as explained in the Examples described later.

[Applications of Lubricating Oil Composition]

The lubricating oil composition in a preferred aspect of the present invention has excellent properties such as abrasion resistance between metals, electrical insulation, and the effect of preventing copper elution.

Therefore, the lubricating oil composition in one aspect of the present invention can be applied to various machines that may exert the above properties. For example, it can be preferably used in a hydraulic system, a stationary transmission, an automotive transmission, or a cooling system for at least one of a motor and a battery.

In addition, given the above-described properties of the lubricating oil composition of the present invention, the invention may also provide the following [1] and [2].

[1] A machine using the above-described lubricating oil composition in one aspect of the present invention. It is preferable that the machine is a hydraulic system, a stationary transmission, an automotive transmission, or a cooling system for at least one of a motor and a battery.

[2] Use of a lubricating oil composition, which comprises using the above-described lubricating oil composition in one aspect of the present invention in a hydraulic system, a stationary transmission, an automotive transmission, or a cooling system for at least one of a motor and a battery.

EXAMPLES

Next, the present invention will be described in more detail with reference to the Examples below, but the present invention is not limited to these examples. The methods of measuring various physical properties are as follows:

(1) Kinetic viscosity, viscosity index
Measured and calculated in accordance with JIS K2283: 2000.
(2) Contents of phosphorus atoms, calcium atoms, and copper atoms
Measured in accordance with JPI-5S-38-92.
(3) Content of sulfur atoms
Measured in accordance with JIS K2541-6:2013.
(4) Base number (perchloric acid method)
Measured in accordance with JIS K2501:2003.

EXAMPLES 1 TO 19, COMPARATIVE EXAMPLES 1 TO 7

A base oil, a phosphorus compound, a sulfur compound, a metal salt, and other additives were mixed according to the types and amounts shown in Tables 1 to 3, thereby separately preparing lubricating oil compositions each having a kinetic viscosity of 10 $mm^2/s$.

Details of each component used in the preparation of the lubricating oil composition are as follows.

<Base Oil>
Base oil (a-i): Paraffin-based mineral oil classified as Group II, kinetic viscosity at 40° C.=9.4 $mm^2/s$, viscosity index=108.

<Phosphorus Compound>
Neutral phosphorus compound (b-i): Tricresyl phosphate; content of phosphorus atoms=8.3% by mass.
Acidic phosphorus compound (c-i): Amine salt of acidic phosphate ester represented by the general formula (c-11) (amine constituting the amine salt is a compound of the general formula (c-3) where q=1, $R^3$=an alkyl group having 6 to 18 carbon atoms); content of phosphorus atoms=2.5% by mass.

Acidic phosphorus compound (c-ii): Acidic phosphate ester represented by the general formula (c-11); content of phosphorus atoms=6.3% by mass.
Acidic phosphorus compound (c-iii): Acidic phosphite ester represented by the general formula (c-22); content of phosphorus atoms=5.3% by mass.
Acidic phosphorus compound (c-iv): Acidic phosphite ester represented by the general formula (c-21); content of phosphorus atoms=1.3% by mass.

<Sulfur Compound>
Thiadiazole: Compound represented by the general formula (d-1); content of sulfur atoms=35% by mass.

<Metal Salt>
Overbased Ca sulfonate: Compound represented by the general formula (e-1) (where M is a calcium atom); base number (perchloric acid method)=300 mg KOH/g; and content of Ca atoms=12% by mass.
Neutral Ca sulfonate: Compound represented by the general formula (e-1) (where M is a calcium atom); base number (perchloric acid method)=30 mg KOH/g; and content of Ca atoms=2.7% by mass.

<Other Additives>
Pour Point Depressant
Additive package: Mixture consisting of phenolic antioxidant, amine antioxidant, anti-foam agent, corrosion inhibitor, and ash-free dispersant.

For the prepared lubricating oil compositions, the kinetic viscosity at 40° C., the volume resistivity, and the wear scar size of a test ball when performing shell four-ball abrasion test were determined. For the lubricating oil compositions prepared in some of the Examples and Comparative Examples, the amount of copper eluted after the ISOT test was also determined. These results are shown in Tables 1 to 3.

(1) Volume Resistivity
The volume resistivity of each sample oil was measured under conditions of a measurement temperature of 80° C., an applied voltage of 250 V, a measurement time of 1 minute in accordance with JIS C2101. The higher the volume resistivity, the more excellent the insulation of the lubricating oil composition.

(2) Wear Scar Size of a Test Ball when Performing Shell Four-Ball Abrasion Test
In accordance with ASTM D4172, the wear scar size (unit: mm) of a test ball when performing a shell four-ball abrasion test was determined at a test temperature of 80° C., a load of 392 N, a rotational speed of 1800 rpm, and a test time of 30 minutes. The smaller the value of the wear scar size, the more excellent the abrasion resistance between metals of the lubricating oil composition.

(3) Amount of Copper Eluted after the ISOT Test
An ISO test in accordance with JIS K2514 was conducted at a temperature of 165.5° C. for 144 hours, and the sample oil was degraded using copper pieces as a catalyst. The amount of copper eluted (unit: ppm by mass) was determined in accordance with JPI-5S-38-92. The smaller the value of the copper eluted, the greater the effect of preventing copper elution of the lubricating oil composition.

TABLE 1

| | | | | Ex. 1 | Ex. 2 | Ex. 3 | Ex. 4 | Comp. Ex. 1 | Comp. Ex. 2 | Ex. 5 | Comp. Ex. 3 | Comp. Ex. 4 | Comp. Ex. 5 |
|---|---|---|---|---|---|---|---|---|---|---|---|---|---|
| Base oil | Base oil (a-i) | Blending a-mount | % by mass | 95.81 | 96.11 | 96.01 | 95.61 | 96.21 | 95.41 | 96.42 | 96.66 | 96.01 | 96.52 |

TABLE 1-continued

| | | | | Ex. 1 | Ex. 2 | Ex. 3 | Ex. 4 | Comp. Ex. 1 | Comp. Ex. 2 | Ex. 5 | Comp. Ex. 3 | Comp. Ex. 4 | Comp. Ex. 5 |
|---|---|---|---|---|---|---|---|---|---|---|---|---|---|
| Phosphorus compound | Neutral phosphorus compound (b-i) | Blending amount | % by mass | 0.84 | 0.84 | 0.84 | 0.84 | 0.84 | 0.84 | 0.24 | | 0.84 | 0.24 |
| | | In terms of P | ppm by mass | 700 | 700 | 700 | 700 | 700 | 700 | 200 | | 700 | 200 |
| | Acidic phosphorus compound (c-i) | Blending amount | % by mass | 0.40 | 0.10 | 0.20 | 0.60 | | 0.80 | 0.40 | 0.40 | 0.40 | 0.20 |
| | | In terms of P | ppm by mass | 100 | 25 | 50 | 150 | | 200 | 100 | 100 | 100 | 50 |
| | Acidic phosphorus compound (c-ii) | Blending amount | % by mass | | | | | | | | | | |
| | | In terms of P | ppm by mass | | | | | | | | | | |
| | Acidic phosphorus compound (c-iii) | Blending amount | % by mass | | | | | | | | | | |
| | | In terms of P | ppm by mass | | | | | | | | | | |
| | Acidic phosphorus compound (c-iv) | Blending amount | % by mass | | | | | | | | | | |
| | | In terms of P | ppm by mass | | | | | | | | | | |
| Sulfur compound | Thiadiazole | Blending amount | % by mass | 0.20 | 0.20 | 0.20 | 0.20 | 0.20 | 0.20 | 0.20 | 0.20 | | 0.30 |
| | | In terms of S | ppm by mass | 700 | 700 | 700 | 700 | 700 | 700 | 700 | 700 | | 1050 |
| Metal salt | Overbased Ca sulfonate | Blending amount | % by mass | 0.042 | 0.042 | 0.042 | 0.042 | 0.042 | 0.042 | 0.042 | 0.042 | 0.042 | 0.042 |
| | | In terms of Ca | ppm by mass | 50 | 50 | 50 | 50 | 50 | 50 | 50 | 50 | 50 | 50 |
| | Neutral Co sulfonate | Blending amount | % by mass | | | | | | | | | | |
| | | In terms of Ca | ppm by mass | | | | | | | | | | |
| Other additives | Pour point depressant | Blending amount | % by mass | 0.20 | 0.20 | 0.20 | 0.20 | 0.20 | 0.20 | 0.20 | | 0.20 | 0.20 |
| | Additive package | Blending amount | % by mass | 2.50 | 2.50 | 2.50 | 2.50 | 2.50 | 2.50 | 2.50 | 2.50 | 2.50 | 2.50 |
| | Total | | % by mass | 100.00 | 100.00 | 100.00 | 100.00 | 100.00 | 100.00 | 100.00 | | 100.00 | 100.00 |
| | Ratio (mass ratio) of content of S atoms of sulfur compound/content of Ca atoms of metal salt | | — | 14.0 | 14.0 | 14.0 | 14.0 | 14.0 | 14.0 | 14.0 | 14.0 | 0.0 | 21.0 |

TABLE 1-continued

|  |  |  | Ex. 1 | Ex. 2 | Ex. 3 | Ex. 4 | Comp. Ex. 1 | Comp. Ex. 2 | Ex. 5 | Comp. Ex. 3 | Comp. Ex. 4 | Comp. Ex. 5 |
|---|---|---|---|---|---|---|---|---|---|---|---|---|
| Evaluation of properties of lubricating oil composition | Kinetic viscosity at 40° C. | mm²/s | 10 | 10 | 10 | 10 | 10 | 10 | 10 | 10 | 10 | 10 |
| | Volume resistivity (80° C., 250V) | Ωm | $1.0 \times 10^8$ | $1.6 \times 10^8$ | $1.4 \times 10^8$ | $6.9 \times 10^7$ | $2.0 \times 10^8$ | $4.0 \times 10^7$ | $1.1 \times 10^8$ | $1.1 \times 10^8$ | $2.6 \times 10^8$ | $9.6 \times 10^7$ |
| | Wear scar size of test ball when performing shell four-ball abrasion test (80° C., 392N, 30 min) | mm | 0.64 | 0.63 | 0.62 | 0.65 | 0.73 | 0.63 | 0.66 | | 0.72 | 0.84 |
| | Amount of copper eluted after ISOT test (165.5° C., 144 hours) | ppm by mass | 20 | | | | 25 | | 24 | | 39 | 42 |

TABLE 2

|  |  |  |  | Ex. 6 | Ex. 7 | Comp. Ex. 6 | Comp. Ex. 7 | Ex. 8 | Ex. 9 | Ex. 10 | Ex. 11 |
|---|---|---|---|---|---|---|---|---|---|---|---|
| Base oil | Base oil (a-i) | Blending amount | % by mass | 95.77 | 95.73 | 95.86 | 95.69 | 96.62 | 96.72 | 96.68 | 96.53 |
| Phosphorus compound | Neutral phosphorus compound (b-i) | Blending amount | % by mass | 0.84 | 0.84 | 0.24 | 0.24 | 0.24 | 0.24 | | |
| | | In terms of P | ppm by mass | 700 | 700 | 700 | 700 | 200 | 200 | 200 | 200 |
| | Acidic phosphorus compound (c-i) | Blending amount | % by mass | 0.40 | 0.40 | 0.40 | 0.40 | 0.20 | 0.20 | 0.20 | 0.20 |
| | | In terms of P | ppm by mass | 100 | 100 | 100 | 100 | 50 | 50 | 50 | 50 |
| | Acidic phosphorus compound (c-ii) | Blending amount | % by mass | | | | | | | | |
| | | In terms of P | ppm by mass | | | | | | | | |
| | Acidic phosphorus compound (c-iii) | Blending amount | % by mass | | | | | | | | |
| | | In terms of P | ppm by mass | | | | | | | | |
| | Acidic phosphorus compound (c-iv) | Blending amount | % by mass | | | | | | | | |
| | | In terms of P | ppm by mass | | | | | | | | |
| Sulfur compound | Thiadiazole | Blending amount | % by mass | 0.20 | 0.20 | 0.20 | 0.20 | 0.20 | 0.10 | 0.10 | 0.10 |
| | | In terms of S | ppm by mass | 700 | 700 | 700 | 700 | 700 | 350 | 350 | 350 |
| Metal salt | Overbased Co sulfonate | Blending amount | % by mass | 0.083 | 0.125 | | 0.167 | 0.042 | 0.042 | 0.083 | 0.042 |
| | | In terms of Ca | ppm by mass | 100 | 150 | | 200 | 50 | 50 | 100 | 50 |
| | Neutral Co sulfonate | Blending amount | % by mass | | | | | | | | |
| | | In terms of Ca | ppm by mass | | | | | | | | |
| Other additives | Pour point depressant | Blending amount | % by mass | 0.20 | 0.20 | 0.20 | 0.20 | 0.20 | 0.20 | 0.20 | 0.20 |
| | Additive package | Blending amount | % by mass | 2.50 | 2.50 | 2.50 | 2.50 | 2.50 | 2.50 | 2.50 | 2.50 |
| | Total | | % by mass | 100.00 | 100.00 | 100.00 | 100.00 | 100.00 | 100.00 | 100.00 | 100.00 |
| | Ratio (mass ratio) of content of S atoms of sulfur compound/content of Ca atoms of metal salt | | — | 7.0 | 4.7 | | 3.5 | 14.0 | 7.0 | 3.5 | 3.5 |
| | Kinetic viscosity at 40° C. | | mm²/s | 10 | 10 | 10 | 10 | 10 | 10 | 10 | 10 |

TABLE 2-continued

|  |  |  | Ex. 6 | Ex. 7 | Comp. Ex. 6 | Comp. Ex. 7 | Ex. 8 | Ex. 9 | Ex. 10 | Ex. 11 |
|---|---|---|---|---|---|---|---|---|---|---|
| Evaluation of properties of lubricating oil composition | Volume resistivity (80° C. 250V) | Ωm | 7.9 × $10^7$ | 5.0 × $10^7$ | 2.2 × $10^8$ | 3.2 × $10^7$ | 1.4 × $10^8$ | 1.9 × $10^8$ | 1.3 × $10^8$ | 1.4 × $10^8$ |
|  | Wear scar size of test ball when performing shell four-ball abrasion test (80° C. 392N 30 min) | mm | 0.63 | 0.60 | 0.47 | 0.80 | 0.68 | 0.58 | 0.60 | 0.64 |
|  | Amount of copper eluted after ISOT test (165.5° C. 144 hours) | ppm by mass |  |  | 37 |  | 22 | 18 | 21 | 24 |

|  |  |  |  | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| Base oil | Base oil (a-i) | Blending amount | % by mass | 96.06 | 96.14 | 96.12 | 95.83 | 96.24 | 95.93 | 96.12 | 95.85 |
| Phosphorus compound | Neutral phosphorus compound (b-i) | Blending amount | % by mass | 0.84 | 0.84 | 0.64 | 0.84 | 0.84 | 0.84 | 0.84 | 0.84 |
|  |  | In terms of P | ppm by mass | 700 | 700 | 700 | 700 | 700 | 700 | 700 | 700 |
|  | Acidic phosphorus compound (c-i) | Blending amount | % by mass |  |  |  |  |  |  |  |  |
|  |  | In terms of P | ppm by mass |  |  |  |  |  |  |  |  |
|  | Acidic phosphorus compound (c-ii) | Blending amount | % by mass | 0.16 | 0.08 |  |  | 0.08 |  |  | 0.08 |
|  |  | In terms of P | ppm by mass | 100 | 50 |  |  | 50 |  |  | 50 |
|  | Acidic phosphorus compound (c-iii) | Blending amount | % by mass |  |  |  | 0.09 |  |  |  |  |
|  |  | In terms of P | ppm by mass |  |  |  | 50 |  |  |  |  |
|  | Acidic phosphorus compound (c-iv) | Blending amount | % by mass |  |  |  |  | 0.38 |  | 0.38 | 0.19 | 0.38 |
|  |  | In terms of S | ppm by mass |  |  |  |  | 50 |  | 50 | 25 | 50 |
| Sulfur compound | Thiadiazole | Blending amount | % by mass | 0.20 | 0.20 | 0.20 | 0.20 | 0.10 | 0.10 | 0.10 | 0.10 |
|  |  | In terms of Ca | ppm by mass | 700 | 700 | 700 | 700 | 350 | 350 | 350 | 350 |
| Metal salt | Overbased Ca sulfonate | Blending amount | % by mass | 0.042 | 0.042 | 0.042 | 0.042 | 0.042 | 0.042 | 0.042 | 0.042 |
|  | Neutral Ca sulfonate | In terms of Ca | ppm by mass | 50 | 50 | 50 | 50 | 50 | 50 | 50 | 50 |
| Other additives | Pour point depressant | Blending amount | % by mass | 0.20 | 0.20 | 0.20 | 0.20 | 0.20 | 0.20 | 0.20 | 0.20 |
|  | Additive package | Blending amount | % by mass | 2.50 | 2.50 | 2.50 | 2.50 | 2.50 | 2.50 | 2.50 | 2.50 |
|  | Total |  | % by mass | 100.00 | 100.00 | 100.00 | 100.00 | 100.00 | 100.00 | 100.00 | 100.00 |
| Ratio (mass ratio) of content of S atoms of sulfur compound/content of Ca atoms of metal salt |  |  | — | 14.0 | 14.0 | 14.0 | 14.0 | 7.0 | 7.0 | 7.0 | 7.0 |
| Evaluation of properties of lubricating oil composition | Kinetic viscosity at 40° C. | mm²/s | 10 | 10 | 10 | 10 | ID | 10 | 10 | 10 |
|  | Volume resistivity (80° C., 250V) | Ωm | 7.7 × $10^7$ | 1.1 × $10^8$ | 1.2 × $10^8$ | 7.7 × $10^7$ | 1.7 × $10^8$ | 1.1 × $10^8$ | 1.3 × $10^8$ | 1.1 × $10^8$ |
|  | Wear scar size of test ball when performing shell four-ball abrasion test (80° C., 392 N, 30 min) | mm | 0.54 | 0.60 | 0.66 | 0.60 | 0.58 | 0.52 | 0.66 | 0.63 |
|  | Amount of copper eluted after ISOT test (165.5° C. 144 hours) | ppm by mass |  |  |  |  |  |  |  |  |

Tables 1 to 3 shows that the lubricating oil compositions prepared in Examples 1 to 19 have a high volumetric resistivity, excellent insulation, a small wear scar size, and excellent abrasion resistance between metals. In addition, the lubricating oil compositions are considered to have the great effect of preventing copper elution.

On the other hand, the results show that the lubricating oil compositions prepared in Comparative Examples 1-7 was inferior in at least one of the insulation, abrasion resistance, and the reduced effect of preventing copper elution.

The invention claimed is:

1. A lubricating oil composition, comprising:
a base oil (A);
a neutral phosphorus compound (B), which is a trisubstituted aromatic phosphate, trisubstituted aliphatic phosphate, or mixture of two or more of any of these;
an acidic phosphorus compound (C);
a sulfur compound (D); and
a metal salt (E), which is a calcium sulfonate,
wherein the neutral phosphorus compound (B), in terms of phosphorus atoms, is present in a range of from 100 to 1500 ppm by mass, based on the total lubricating oil composition mass,
wherein the acidic phosphorus compound (C), in terms of phosphorus atoms, is present in a range of from 10 to 180 ppm by mass, based on total lubricating oil composition mass,
wherein the acidic phosphorus compound (C) comprises a compound (C1) of formula (c-1), a compound (C2) of formula (c-2), and/or an amine salt (C3) of the compound (C1) or (C2):

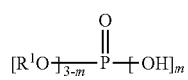

(c-1)

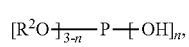

(c-2)

$R^1$ and $R^2$ in formulas (c-1) and (c-2) independently being a hydrocarbon group comprising 6 to 30 carbon atoms, and m and n independently being 1 or 2, wherein the sulfur compound (D), in terms of sulfur atoms, is present in a range of from 200 to 1000 ppm by mass, based on the total lubricating oil composition mass, wherein the sulfur compound (D) comprises a compound (D1) of formula (d-1):

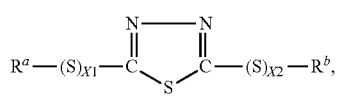

(d-1)

$R^a$ and $R^b$ independently being a hydrocarbon group, and X1 and X2 independently being an integer in a range of from 1 to 3, and
wherein the metal salt (E), in terms of calcium atoms, is present in a range of from 30 to 180 ppm by mass, based on the total lubricating oil composition mass.

2. The composition of claim 1 wherein the neutral phosphorus compound (B), in terms of phosphorus atoms, is present in a range of from 200 to 1000 ppm by mass, based on the total lubricating oil composition mass.

3. The composition of claim 1, comprising the compound (C1) of formula (c 1).

4. The composition of claim 1, wherein the sulfur compound (D) is present in a range of from 300 to 750 ppm.

5. The composition of claim 1, wherein the metal salt (E) comprises an overbased metal salt (E1) having a base number of 100 mg KOH/g or more.

6. The composition of claim 1, wherein a (D)/(E) content ratio of the sulfur compound (D), in terms of sulfur atoms, to the metal salt (E), in terms of metal atoms, is in a range of from 3.0 to 20.0, in terms of mass ratio.

7. The composition of claim 1, having a kinetic viscosity at 40° C. in a range of from 6.0 to 18.0 mm$^2$/s.

8. The composition of claim 1, having a volume resistivity, measured at a measurement temperature of 80° C. and an applied voltage of 250 V, in accordance with JIS C2101, of $5.0 \times 10^7$ Ωm or more.

9. The composition of claim 1, wherein when a shell four-ball abrasion test is performed using the lubricating oil composition at a rotational speed of 1800 rpm, a test temperature of 80° C., a load of 392 N, and a test time of 30 minutes, in accordance with ASTM D4172, a wear scar size of a test ball is 0.70 mm or less.

10. The composition of claim 1, wherein, when an ISOT test using the lubricating oil composition with a copper piece used as a catalyst is performed at a test temperature of 165.5° C. and a test time of 144 hours, in accordance with JIS K2514, an amount of copper eluted of degraded oil after the test is less than 30 ppm by mass.

11. A method for producing the composition of claim 1, the method comprising:
blending a base oil (A) with a neutral phosphorus compound (B), an acidic phosphorus compound (C), a sulfur compound (D), and a metal salt (E) comprising a metal sulfonate, a metal salicylate, and/or a metal phenate.

12. A machine, comprising:
the composition of claim 1.

13. The machine of claim 12, wherein the machine is a hydraulic system, a stationary transmission, an automotive transmission, or a cooling system configured for a motor and/or a battery.

14. A method of lubricating a machine, the method comprising:
contacting the composition of claim 1 with a hydraulic system, a stationary transmission, an automotive transmission, or a cooling system configured for a motor and/or a battery.

15. The composition of claim 1, comprising the compound (C2) of formula (c-2).

16. The composition of claim 1, comprising the amine salt (C3) of the compound (C1) or (C2).

17. The composition of claim 1, wherein the neutral phosphorus compound (B), in terms of phosphorus atoms, is present in a range of from 200 to 800 ppm by mass, based on the total lubricating oil composition mass.

18. The composition of claim 1, wherein the neutral phosphorus compound (B) is tricresyl phosphate, triphenyl phosphate, trixylenyl phosphate, dicresyl monophenyl phosphate, tributyl phosphate, tri-2-ethylhexyl phosphate, tributoxy phosphate, diphenyhnonotridecyl phosphate, or a mixture thereof.

* * * * *